(12) United States Patent
Farries (10) Patent No.: US 6,201,907 B1
(45) Date of Patent: Mar. 13, 2001

(54) OPTICAL DROP CIRCUIT HAVING GROUP DELAY COMPENSATION

(75) Inventor: Mark Farries, Nepean (CA)

(73) Assignee: JDS Fitel Inc., Nepean (CA)

( * ) Notice: Subject to any disclaimer, the term of this patent is extended or adjusted under 35 U.S.C. 154(b) by 0 days.

(21) Appl. No.: 09/275,961

(22) Filed: Mar. 25, 1999

(30) Foreign Application Priority Data

Jun. 26, 1998 (CA) .................................................. 2241707

(51) Int. Cl.$^7$ .................................................. G02B 6/293
(52) U.S. Cl. ............................ 385/24; 359/127; 359/130; 385/37
(58) Field of Search ................................ 385/15, 24, 27, 385/37; 359/124, 127, 130

(56) References Cited

U.S. PATENT DOCUMENTS

| | | | | |
|---|---|---|---|---|
| 5,748,349 | * | 5/1998 | Mizrahi ................................ | 359/130 |
| 5,912,999 | * | 6/1999 | Brennan, III et al. ................. | 385/37 |
| 5,974,206 | * | 10/1999 | Bricheno et al. .................... | 385/27 X |
| 5,982,518 | * | 11/1999 | Mizrahi ................................ | 359/130 |
| 6,020,986 | * | 2/2000 | Ball ..................................... | 359/130 |

OTHER PUBLICATIONS

Kashyap et al, "1.3 m long super–step–chirped fibre Bragg grating with a continuous delay of 13.5 ns and bandwidth 10 nm for broadband dispersion compensation", Electronics Letters, vol. 32, No. 19, Sep. 12, 1996, pp. 1807–1809.*

"Dispersion Compensation Over Distances in Excess of 500 km for 10–Gb/s Systems Using Chirped Fiber Gratings" Loh et al. IEEE Photonics Technology Letters, vol. 8, No. 7, Jul. 1996, pp. 944–946.

* cited by examiner

*Primary Examiner*—John D. Lee
(74) *Attorney, Agent, or Firm*—Neil Teitelbaum (57) ABSTRACT

The present invention relates to multi-wavelength filtering devices and more particularly to a multi-channel multiplexer/demultiplexor using at least one multi-port optical circulator and a plurality of Bragg optical fiber gratings or other wavelength selective means. Advantageously a drop or add/drop optical circuit including the combination of a Bragg grating providing a strong reflective response for substantially completely separating a single channel of a band of wavelengths from a plurality of other channels in a multi-channel signal, with a Bragg grating of lower reflective response which is capable of providing group delay compensation to lessen the effects of group delay introduced by the strong Bragg grating with isolation between the Bragg gratings provides a device for accurately and efficiently separating channels from a multiple channel signal with low loss.

21 Claims, 7 Drawing Sheets

OPTICAL DROP CIRCUIT HAVING GROUP DELAY COMPENSATION

This invention relates to multi-wavelength filtering devices and more particularly to a multi-channel multiplexer/demultiplexor using at least one multi-port optical circulator and a plurality of Bragg optical fiber gratings or other wavelength selective means.

BACKGROUND OF THE INVENTION

Optical systems are presently being employed in the communication of voice and video information as well as in the high speed transmission of data. Optical communication systems are desired because of the wide bandwidth available for the information signal channels.

Although this wide bandwidth is available, many of the existing optical fiber systems use only a single channel per optical fiber. Typically, this channel is transmitted at a wavelength of 1310 nm in one direction from a transmitting end to a receiving end and requires a second optical fiber to achieve bidirectional communication; however, recent increase in telecommunications traffic has resulted in a need for further fiber resources. One way this need was met, was to install additional optical fiber cables. Another was to increase the number of channels carried by same fibers.

Recently, technologies that can add additional channels to existing optical fiber cables already in the ground, have gained acceptance. These technologies seek to provide more than one channel on a single existing optical fiber and are therefore aimed at enhancing the efficiency of the existing fiber optic cable network. These technologies include wavelength division multiplexing (WDM) and bidirectional transmission.

When a number of wavelengths are multiplexed and transmitted on a single optical fiber, customarily, these channels must later be demultiplexed into separate channels or wavelengths of light. For example, it may be cost effective to transmit signals of wavelength $\lambda 1, \lambda 2, \lambda 3, \lambda 4, \lambda 5$, and $\lambda 6$ ($\lambda$ denoting a wavelength, lambda) along a single optical fiber, however, demultiplexing means are required to separate the light into six separate channels. Of course, it is desired to perform this demultiplexing at a minimum cost and with as little signal loss as possible.

Various types of optical filters have been contemplated and used to separate light of differing wavelengths. Unfortunately, coupling and other losses associated with many of these arrangements have led to devices that are less than satisfactory. For example, dichoric filters are widely used as WDM devices; however, the reduction of channel spacing as well as the passband is limited by the current interference filter technology.

As of late, in-fiber Bragg gratings have become more prevalent in the field of fiber optics. An optical system utilizing Bragg gratings in combination with an optical circulator is shown in U.S. Pat. No. 5,283,686 issued Feb. 1, 1994 in the name of David Huber and assigned to General Instrument Corporation, Jerrold Communications, Hatboro, Pa. However, there are certain problems associated with the use of Bragg gratings; for example, the coupling losses in utilizing Bragg gratings and circulators alone as a means of multiplexing/demultiplexing in high density applications may in some instances be prohibitive. Furthermore, low yield, and cost are further disadvantages.

Fibre Bragg gratings have been used to compensate for dispersion present in optical signals. One such circuit is described in a paper entitled Dispersion Compensation Over Distances in Excess of 500 km for 10-Gb/s Systems Using Chirped Fiber Gratings, by W. H. Loh, et al in IEEE Photonics Technology Letters, Vol. 8, No, 7 July 1996 incorporated herein by reference.

Bragg gratings have been know to be used in add-drop optical circuits, where it is desired to drop a particular channel from a group of multiplexed channels, and to subsequently add-in a channel having the same wavelength as the dropped channel. However, one known problem with circuits of this type is that unwanted group delay occurs when "strong" Bragg gratings are used. Such "strong" gratings are reflective gratings having a steep wavelength response designed to reflect an entire predetermined band or channel with high isolation from adjacent transmitted channels, thereby providing minimal crosstalk.

Heretofore, group delay or dispersion has been in part remedied by the use of dispersion compensation fibre, or other means of dispersion compensation, however the group delay relating to "strong" Bragg gratings is complex non-linear phenomenon, and is not remedied only by use of dispersion compensated optical fibre.

It is an object of this invention to provide a drop circuit that is capable of dropping a predetermined channels from a multi-channel signal with less loss group delay within the dropped channel band than prior art devices that use Bragg gratings and provide high isolation.

It is an object of the invention to provide a convenient relatively inexpensive circuit for providing an add-drop function with minimized group delay.

Accordingly, in a preferred embodiment the present invention provides an optical drop circuit for dropping a channel n comprising a band of wavelengths of light centered about a wavelength $\lambda n$ from a signal including channel n and a plurality of other channels comprising bands of different wavelengths of light, and for providing group delay compensation to the dropped channel n comprising:

an input port for introducing the signal;

a first Bragg grating having a strong reflective response for separating substantially all wavelengths of light in the band corresponding to channel n from the wavelengths of light corresponding to the plurality of other channels in the signal;

a pass-through port for transmitting the wavelengths of light corresponding to the plurality of other channels separated by the first Bragg grating;

a second Bragg grating having a lower reflective response than the first Bragg grating for separating the wavelengths of light corresponding to channel n from the different wavelengths of light in the plurality of other channels, said second Bragg grating having a period length and refractive index difference to lessen group delay for the band centered about the wavelength $\lambda n$ introduced by the first Bragg grating for providing group delay compensation for wavelengths of light corresponding to channel n;

isolation means between the first and the second filter means; and, an output port for transmitting the wavelengths of light corresponding to channel n separated and provided with group delay compensation by the second Bragg grating.

In a further preferred embodiment the present invention provides an add/drop optical circuit for dropping a channel n comprising a band of wavelengths of light centered about a wavelength $\lambda n$ from a signal including a plurality of channels comprising bands of different wavelengths of light, for providing group delay compensation to the dropped channel n, and for introducing a new channel n replacing the dropped channel n comprising:

an input port for inserting the signal into the circuit;

a first Bragg grating having a strong reflective response for reflecting substantially all the channel n wavelengths and transmitting a remaining portion of the signal;

first output means for transmitting the remaining portion of the signal;

means for introducing the new channel n into the remaining portion of the signal;

a second Bragg grating having a reflective response lower than the first Bragg grating for reflecting the channel n wavelengths and transmitting other wavelengths of light, and for providing group delay compensation for the at least one channel n;

isolation means between the first filter means and the second filter means; and, at least one output port for transmitting the channel n.

A still further preferred embodiment provides a multiple wavelength optical filtering device for optical signal transmission, said device comprising:

a first optical circulator having at least four circulator ports including an input port, and output port and a plurality of intermediate sequential ports for circulating optical signals from the input port to a next sequential port in a circulating direction; and a first Bragg grating filter having a strong reflective response coupled to one of said sequential ports for reflecting a selected portion of said optical signals in a predetermined wavelength band, and for transmitting another portion of said optical signals at other wavelengths outside the predetermined wavelength band; and a second Bragg grating filter having a reflective response lower that the first Bragg grating coupled to another of the sequential ports for transmitting or reflecting the selected portion of the optical signals in the predetermined wavelength band and for providing group delay compensation to lessen group delay in the selected portion of the optical signal.

A preferred embodiment may also comprise an optical drop circuit for dropping a channel n comprising a band of wavelengths of light centered about a wavelength λn from a signal including channel n and a plurality of other channels comprising bands of different wavelengths of light, and for providing group delay compensation to the dropped channel n comprising:

an input port for launching a composite multiplexed optical signal comprising signals corresponding to the plurality of channels and a signal corresponding to the nth channel;

an output port optically coupled with the input port to receive signals corresponding to the plurality of channels in a direction from the input port to the output port, light being prevented from passing in a reverse direction from the output port to the input port;

a drop port for receiving light corresponding to the nth channel launched into the input port that has not propagated to the output port;

a Bragg grating filter disposed between the input port and the output port having a response for separating substantially all wavelengths of light in the band corresponding to channel n from the wavelengths of light corresponding to the plurality of other channels in the signal;

a Bragg grating filter between the output port and the drop port having a response for separating the wavelengths of light corresponding to channel n from the different wavelengths of light in the plurality of other channels, and for providing group delay compensation for wavelengths of light corresponding to channel n; and, isolation means between the two Bragg grating filters for preventing light from passing from the output port to the input port and for preventing unwanted etalon effects from occurring between the two Bragg grating filters.

Advantageously this invention provides separates the function of providing high rejection of the wavelengths associated with a dropped signal channel from a through path and the function of providing low adjacent channel cross talk and substantially constant dispersion by use of a multiple gratings.

Advantageously, the separation of these functions into plural gratings for which the combined response gives the desired filtering function in transmission, reflection and dispersion. The gratings are designed to compensate for each other particularly with regard to dispersion. A wide range of grating combinations can be considered to cover a range of complex functions.

BRIEF DESCRIPTION OF THE DRAWINGS

Exemplary embodiments of the invention will now be described in conjunction with the drawings, in which:

FIG. 1b is a graph of transmission versus wavelength for the drop circuit of FIG. 1a;

FIG. 1c is a graph of group delay versus wavelength for the drop circuit of FIG. 1a;

FIG. 2c is a graph of group delay versus wavelength for the drop circuit of FIG. 2a;

FIG. 2d is a graph depicting the response of transmission versus wavelength for the Bragg grating FBGλ$_2$ in FIG. 2a;

FIG. 2e is a graph depicting the response of group delay versus wavelength for the Bragg grating FBGλ$_{2GDC}$ in FIG. 2a;

DETAILED DESCRIPTION

Figure 1A:
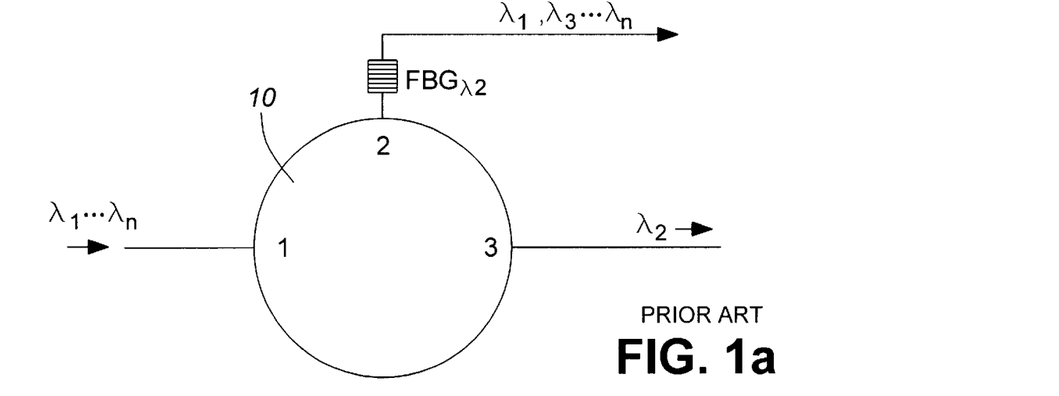
FIG. 1a is a schematic diagram of a prior art optical drop circuit for dropping a single channel from a group of multiplexed channels launched into an optical circulator.
Figure 1B:
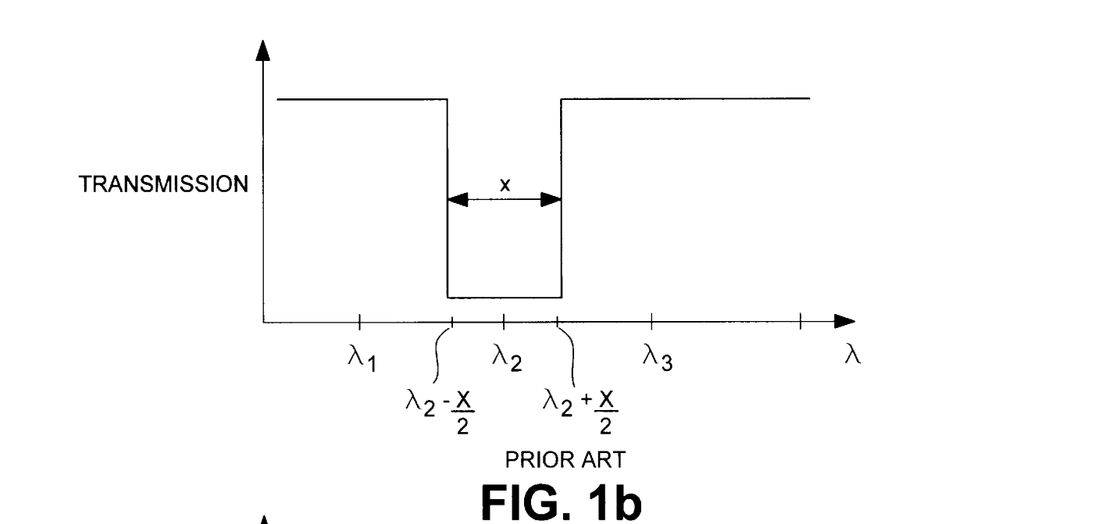

Referring now to prior art FIG. 1, a drop device is provided for dropping a single channel 2, having a central wavelength $\lambda 2$ and bandwidth of x nanometers, x being a predetermined value from a multiplexed signal comprising n channels. Channel n, it is understood, could represent any one of a plurality of q channels greater than n in the multiplexed signal. A 3-port optical circulator 10 having an input port 1 and sequential ports 2 and 3 provides a means of circulating and isolating optical signals. An in-fibre Bragg grating is disposed within an optical fibre coupled with port 2 of the isolator 10. The grating $FBG_{\lambda 2}$ is a highly reflective grating in the wave band about a central wavelength $\lambda 2$ and has a transmission response shown in FIG. 1*b*.

In operation, a multiplexed optical signal consisting of channels 1, 2 . . . n are launched into port 1 of the optical circulator 10 and are circulated to port 2. The signal is then incident upon the grating $FBG_{\lambda 2}$ which reflects substantially most of the light energy at wavelengths within the band of channel 2 and transmits the remaining wavelengths associated with channels 1, 3, 4, . . . n. The reflected light associated with channel 2 is then circulated to port 3 of the circulator 10 wherein it is dropped.

Figure 1C:
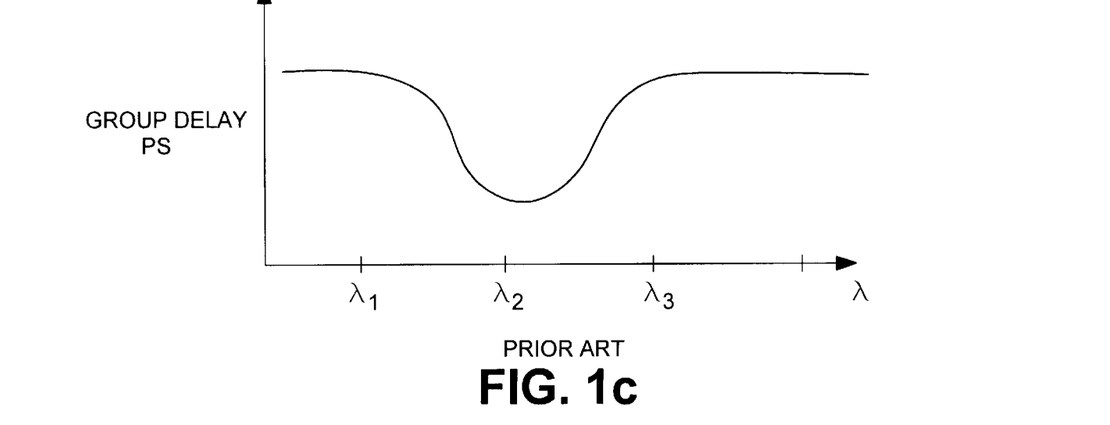

However a limitation of this prior art optical fiber Bragg grating drop device of FIG. 1*a*, is that it does not simultaneously provide high rejection of the wavelengths associated with the dropped signal channel from the through path from port 2; furthermore, it does not provide low adjacent channel cross talk and does not provide a substantially constant dispersion by use of a single grating. FIG. 1*c* more clearly illustrates the non-linear group delay exhibited by the grating $FBG_{\lambda 2}$ The dispersion within channel 2 for wavelengths below $\lambda 2$ is negative and for wavelengths above $\lambda 2$ is positive.

Although dispersion compensated optical fiber is commercially available, this fibre has either a negative or positive group delay and would not compensate for the group delay shown in FIG. 1*c* for wavelengths within channel 2.

Figure 2A:
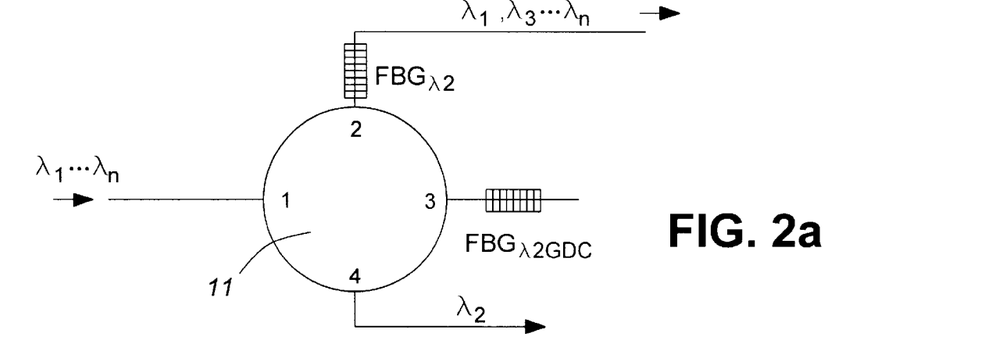
FIG. 2a is a schematic diagram of an optical drop circuit for dropping a single channel from a group of multiplexed channels launched into an optical circulator in accordance with the invention.

FIG. 2*a* is illustrative of a device in accordance with this invention which is a drop circuit which substantially obviates the aforementioned disadvantages associated with the circuit of FIG. 1*a*.

Figure 2B:
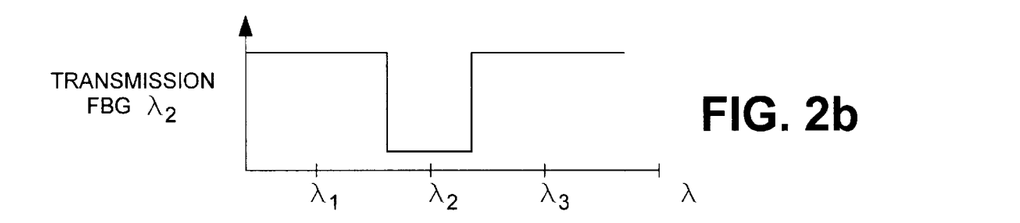
FIG. 2b is a graph of transmission versus wavelength for the drop circuit of FIG. 2a as seen at the output of port 2 after the Bragg grating FBGλ$_2$.
Figure 2C:
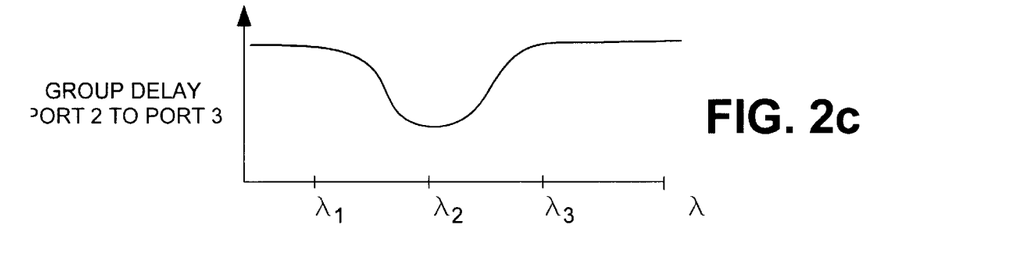
Figure 2D:
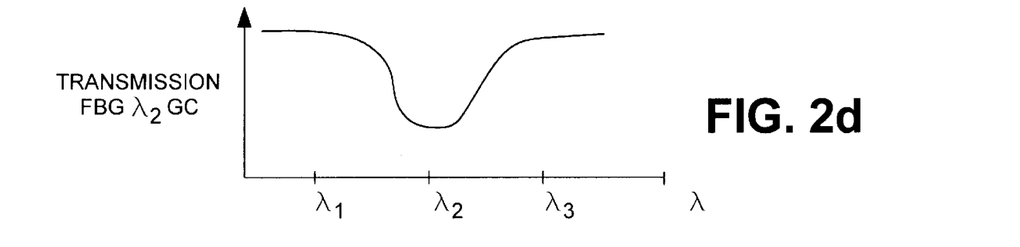
Figure 2E:
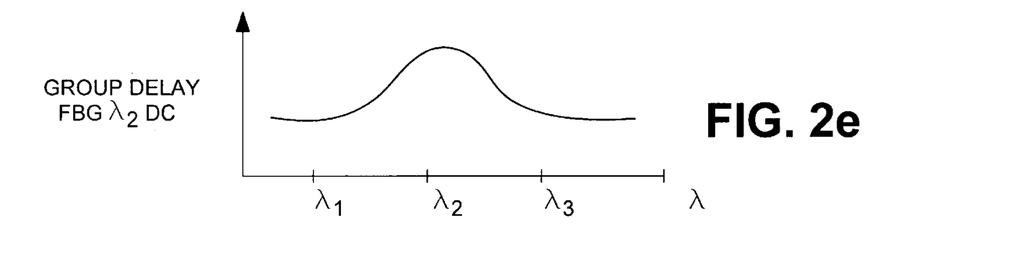

In FIG. 2*a*, a 4 port optical circulator 11 has port 1 configured as an input port for receiving a multiplexed optical signal. An inline optical Bragg grating $FBG_{\lambda 2}$ as is described in FIG. 1*a* is provided for reflecting the light energy within the band of wavelengths associated with channel 2. The transmission spectrum of this grating is shown in FIG. 2*b* The grating is highly reflective for wavelengths associated with channel 2 and suffers from having a large non-linear group delay within the reflected spectrum shown in FIG. 2*c*. A second inline chirped Bragg grating $FBG_{\lambda 2GDC}$ is less reflective than the grating $FBG_{\lambda 2}$ and is chirped to provide a substantially inverse group delay for wavelengths associated with channel 2 is provided within an optical fibre coupled to port 3. The transmission response and group delay response as functions of wavelength are shown in FIGS. 2*d* and 2*e* respectively. In some instances it may be preferable to design the chirped Bragg grating with group delay compensation (GDC) to have response that when combined with the response of the grating $FBG_{\lambda 2}$ that will be flat; and, in other instances it may be preferred to have a group delay of the two gratings that is linear but not flat. Yet in other instances, it may be preferable to having substantially linear combined response, however in all instances it is preferred to have a group delay with a positive slope or a negative slope through the entire band of interest.

Figure 3:
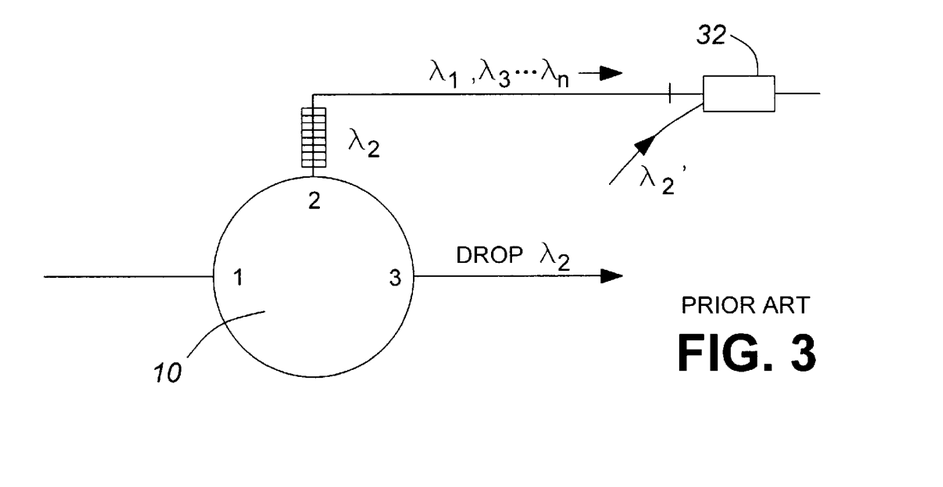
FIG. 3 is a schematic diagram of a prior art optical add-drop circuit for dropping a single channel from a group of multiplexed channels launched into an optical circulator and for adding in a channel having the same central wavelength.

Turning now to FIG. 3, a prior art add-drop circuit is shown. In optical circuits providing this function, it is desired to remove all of the light energy within a band of a particular channel, for example channel 2 in this instance, while transmitting the rest of the channel wavelengths not being dropped. Since the add portion of the circuit couples via a coupler 32 wavelengths within a same channel after dropping light associated with that channel first, ensuring that substantially all of the signal energy has been removed or dropped is essential. Otherwise light, and more importantly data that should have been dropped and inadvertently propagates through the passthrough fibre will mix with the newly added channel and the integrity of the data within that channel may be compromised. As the properties of the grating are optimized and enhanced to cleanly reflect an entire band to be dropped while passing others with acceptably low levels of crosstalk and high isolation, the group delay worsens. Hence a highly reflective grating suffers from a large non-linear group delay.

Figure 4A:
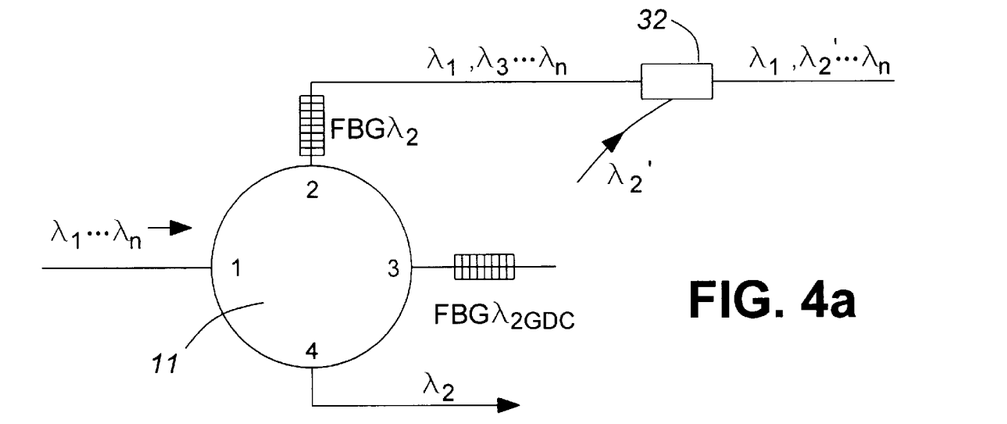
FIG. 4a is a schematic diagram in accordance with this invention of an optical add-drop circuit for dropping a single channel from a group of multiplexed channels launched into an optical circulator and for subsequently adding in a channel having the same central wavelength.

The add-drop circuit of FIG. 4*a* is similar in some respects to the circuit of FIG. 3, however includes an inline grating $FBG\lambda_{2GDC}$ at port 3 providing the function of further filtering low levels of unwanted wavelengths that may be present and for providing dispersion compensation for dispersion resulting from light within the waveband of channel 2 reflecting from different locations along the length of the grating $FBG\lambda_2$ at port 2. A coupler 32 is provided after the grating $FBG\lambda_2$ at port 2 for coupling in a new channel 2 after the previous channel 2 has been dropped.

Figure 4B:
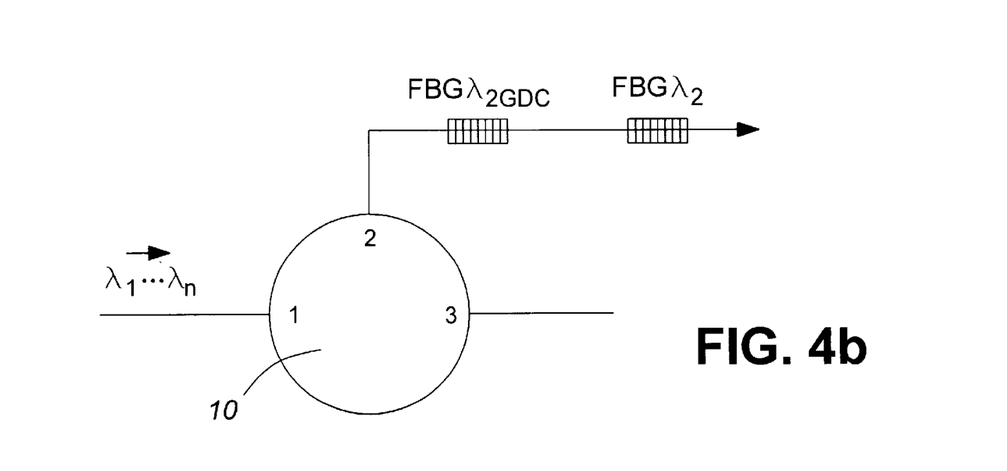
FIG. 4b is a schematic diagram showing two Bragg gratings on a same arm of an optical circulator.

FIG. 4*b* is shown for the purpose of illustrating an optical circuit that does not provide the dispersion compensation required and introduces unwanted noise into the circuit. Here an optical signal having wavelengths $\lambda 1$ . . . $\lambda n$ is launched into port 1 of the optical circulator 10. The light then circulates to port 2 where it is incident upon the inline gratings $FBG\lambda_2$ and $FBG\lambda_{2GDC}$. Because the gratings are disposed along a same arm of the circulator etalon effects occur between the two gratings which themselves serve as etalon mirrors. In embodiments shown heretofore, in accordance with the invention, by placing one grating at one circulating port and another grating at a subsequent circulating port, required isolation is afforded by the properties of the optical circulator itself. Other methods of achieving necessary isolation between the two gratings centered on the same wavelength may also be used, such as optical isolators, or by transmitting signals between gratings disposed on different circulator devices.

Figure 5:
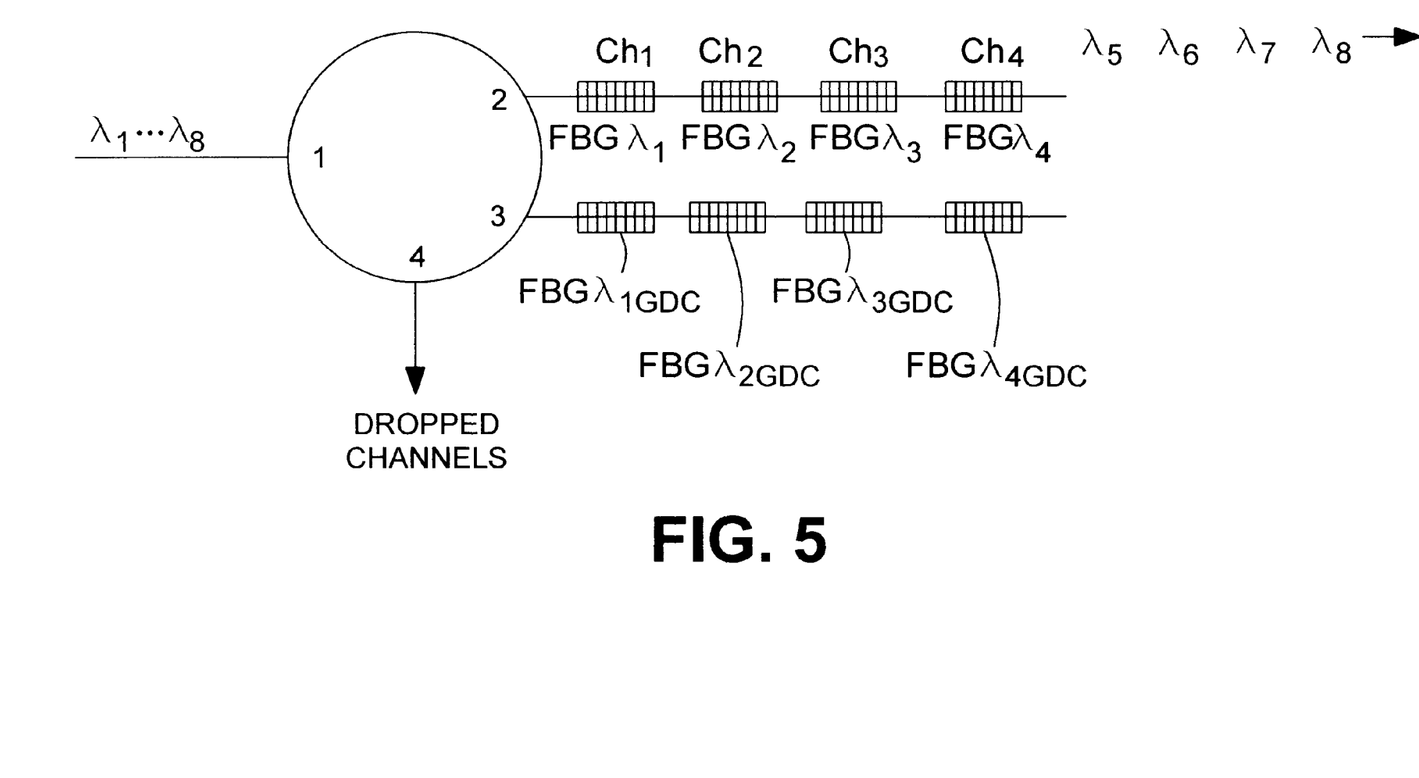
FIG. 5 is a schematic diagram in accordance with this invention of an optical drop circuit in accordance with this invention having group delay compensation and for dropping a plurality of channels from a group of multiplexed channels launched into an optical circulator.

Referring now to FIG. 5, an alternative embodiment of this invention is shown wherein a plurality of inline Bragg gratings $FBG\lambda_1$ $FBG\lambda_2$ $FBG\lambda_3$ $FBG\lambda_4$ corresponding to channels 1, 2, 3, and 4 are optically connected to port 2 of the optical circulator 11. At port 3 four dispersion compensating chirped gratings $FBG\lambda_{1GDC}$ $FBG\lambda_{2GDC}$ $FBG\lambda_{3GDC}$ and $FBG\lambda_{4GDC}$ tuned to compensate for non-linear group delay within their respective bands are provided. These gratings also provide additional filtering of unwanted wavelengths. The dispersion compensated signals corresponding to channels 1, 2, 3, and 4 are dropped from port 4 of the circulator 11. Providing the gratings $FBG\lambda_{1GDC}$ $FBG\lambda_{2GDC}$ $FBG\lambda_{3GDC}$ and $FBG\lambda_{4GDC}$ along one arm does not present the problematic etalon effects of the circuit of FIG. 4b, as the gratings on the single arm are tuned for different wavelengths.

Figure 6:
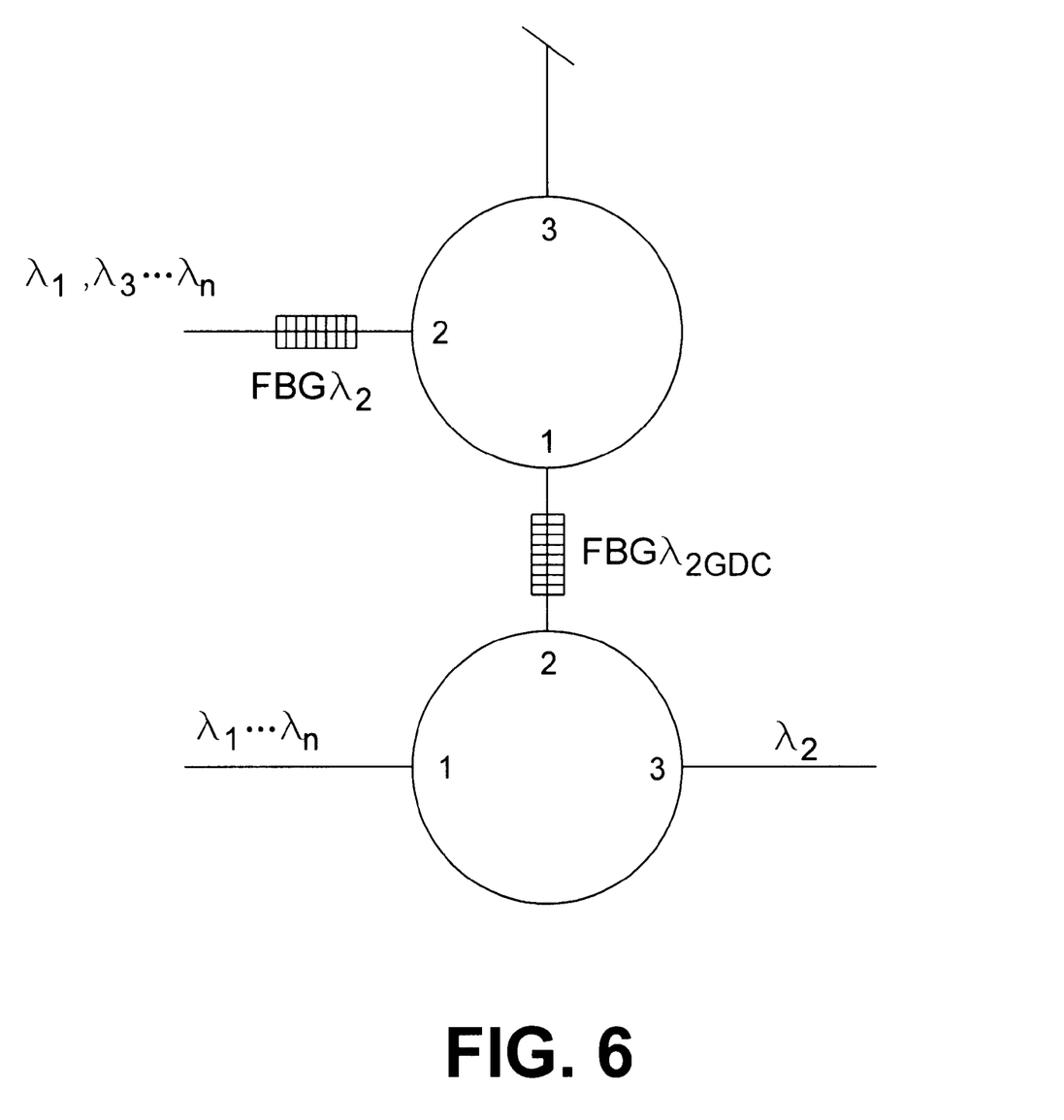
FIG. 6 is a schematic diagram of an embodiment of the invention wherein two optical circulators are configured with Bragg gratings to provide a drop circuit.

FIG. 6 depicts an alternate arrangement wherein two 3-port circulators can be configured to drop a predetermined channel 2 and provide dispersion compensation in accordance with this invention.

Figure 7:
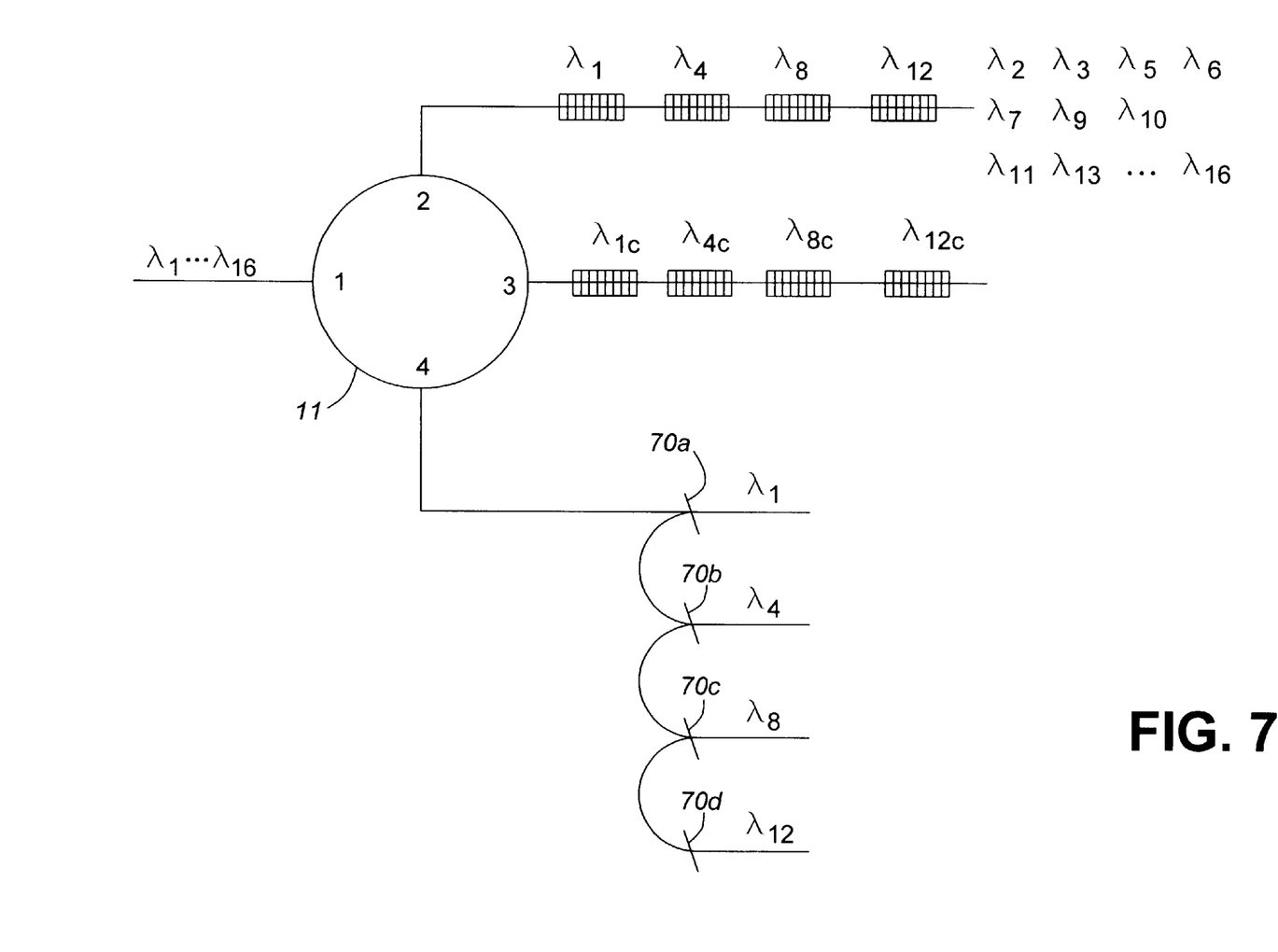
FIG. 7 is a schematic diagram in accordance with an alternative embodiment of this invention of an optical drop circuit in accordance with this invention having group delay compensation and for dropping a plurality of channels from a group of multiplexed channels launched into an optical circulator and having dichroic filters for providing demultiplexing of the dropped channels.

Turning now to FIG. 7, a circuit similar to that of FIG. 5 is shown, wherein demultiplexing occurs by passing the dropped channels through a chained series of dichroic filters 70a, 70b, 70c, and 70d.

Figure 8:
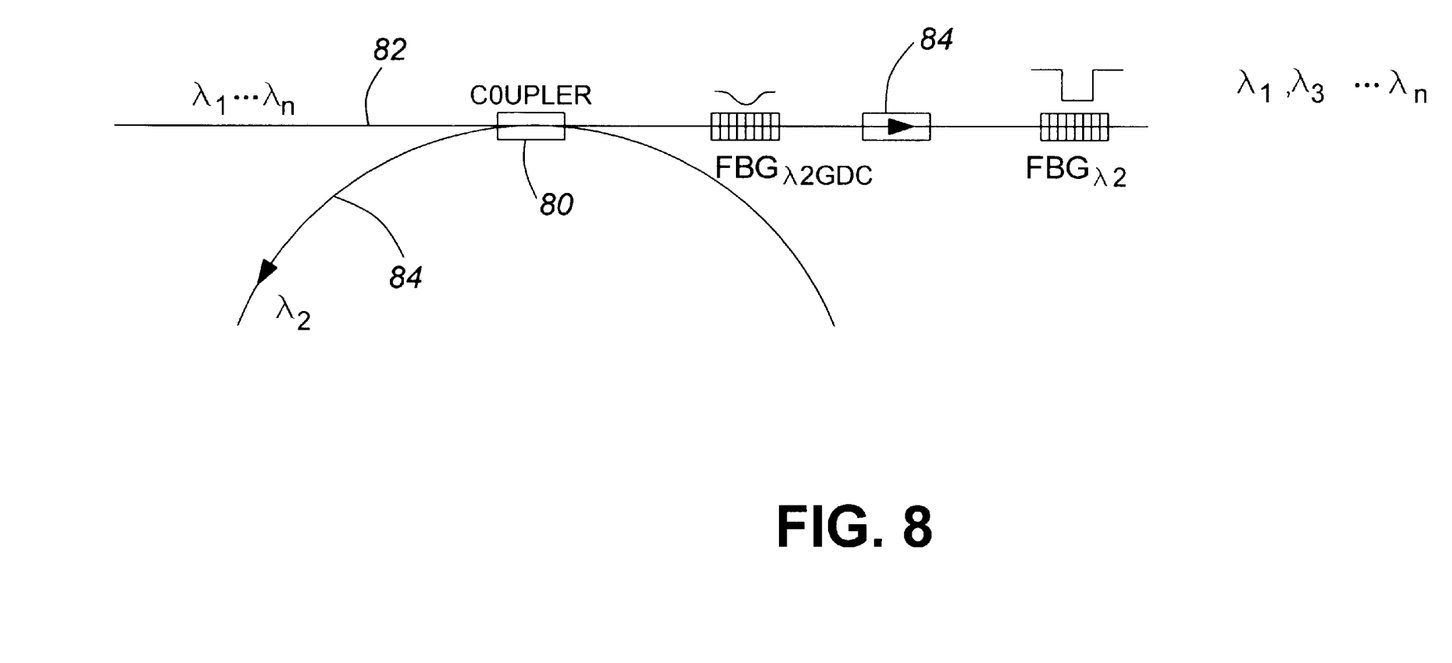
FIG. 8 is a schematic diagram of an alternative embodiment of the invention wherein a coupler is used with two Bragg gratings separated by an optical isolator for dropping a channels from a group of channels.

A less preferred embodiment of the invention is shown in FIG. 8, wherein an optical coupler is used to couple out a dropped channel after filtering and dispersion compensation occurs. In operation an input signal including the wavelengths $\lambda 1 \ldots \lambda n$ is launched into an input end of the coupler along optical fibre 82. The signal is first filtered by the Bragg grating $FBG_{\lambda 2GCD}$ and approximately 90% of the signal within the waveband of channel 2 is reflected backwards and approximately 50% of that signal is coupled into the waveguide 84. Since the grating $FBG_{\lambda 2GCD}$ is a substantially weak grating, little dispersion compensation results. The remaining 10% portion of the signal corresponding to channel 2 is blocked and extinguished by the second grating $FBG_{\lambda 2G}$ and the isolator 84. The optical signal comprising wavelengths corresponding to channels 1, 3, 4, . . . n are passed through both gratings and only channel 2 is dropped. In this circuit, the isolator 84 prevents unwanted etalon effects from occurring between the two inline gratings. Although this embodiment is less expensive to manufacture, it suffers from considerable signal power loss.

Further embodiments will be understood by persons of skill in the art without departing from the spirit and scope of the invention as defined in the appended claims.

What is claimed is:

1. An optical drop circuit for dropping a channel n comprising a band of wavelengths of light centered about a wavelength $\lambda n$ from a composite optical signal including channel n and a plurality of other channels comprising bands of different wavelengths of light, and for providing group delay compensation to the dropped channel n comprising:
   an input port for introducing the signal into the optical drop circuit;
   a first Bragg grating having a strong reflective response for separating substantially all wavelengths of light in the band corresponding to channel n by reflecting said wavelengths from the other wavelengths of light corresponding to the plurality of other channels in the signal by transmitting said other wavelengths;
   a pass-through waveguide for receiving the other wavelengths of light corresponding to the plurality of other channels transmitted through the first Bragg grating;
   a second Bragg grating having a lower reflective response than the first Bragg grating for separating the wavelengths of light corresponding to channel n from the different wavelengths of light in the plurality of other channels, said second Bragg grating having a period length and refractive index difference to lessen group delay for the band centered about the wavelength $\lambda n$ introduced by the first Bragg grating for providing group delay compensation for wavelengths of light corresponding to channel n;
   isolation means disposed between the first and the second Bragg gratings; and,
   an output waveguide for transmitting the wavelengths of light corresponding to channel n separated and provided with group delay compensation by the second Bragg grating via an output port.

2. An optical drop circuit as defined in claim 1, wherein the second Bragg grating is disposed to receive light comprising wavelengths substantially corresponding to channel n from the first Bragg grating through the isolation means, and wherein the first and second Bragg gratings have a period length and refractive index such that they substantially reflect same wavelengths of light and transmit same other wavelengths of light.

3. An optical drop circuit as defined in claim 1, wherein the second Bragg grating comprises a chirped grating to provide group delay or dispersion compensation, to lessen group delay or dispersion introduced by the first Bragg grating.

4. An optical drop circuit as defined in claim 3, wherein the second chirped Bragg grating is adapted to provide a group delay for wavelengths within the band of channel n which, when combined with the group delay induced by the first Bragg grating for the same wavelengths, achieves a group delay that is substantially more linear than the group delay induced only by the first Bragg grating.

5. An optical drop circuit as defined in claim 4, wherein the second chirped Bragg grating is adapted to provide a group delay response which when combined with the group delay response of the first Bragg grating, is substantially flat.

6. An optical drop circuit as defined in claim 4, wherein the second Bragg grating further provides group delay or dispersion compensation to lessen group delay or dispersion existing within the composite signal.

7. An optical drop circuit as defined in claim 1, wherein the isolation means comprise one or more circulators optically coupling the first and second Bragg gratings in cooperating relationship, the one or more circulators for circulating optical signals in a circulating direction.

8. An optical drop circuit as defined in claim 1 wherein the isolation means includes an optical isolator disposed between the first Bragg grating and the second Bragg grating.

9. An optical drop circuit as defined in claim 8, wherein the optical isolator forms part of an optical circulator and wherein the first and second Bragg gratings are optically coupled to sequential circulating ports of the optical circulator.

10. An optical drop circuit as defined in claim 1, wherein the input port, the isolation means and the output port form a part of an optical circulator having one or more intermediate ports, said optical circulator for circulating optical signals from the input port to a next sequential port in a circulating direction, wherein the first Bragg grating is arranged on at least one intermediate port of the circulator, and the second Bragg grating is arranged on at least one subsequent intermediate port in the circulating direction of the circulator.

11. An optical drop circuit as defined in claim 1, wherein the second Bragg grating is disposed to receive a signal and for reflecting the wavelengths in a band centered about λn in which group delay has been lessened by said second Bragg grating, and for transmitting other wavelengths in other bands to couple to the first Bragg grating through the isolation means, the first Bragg grating for reflecting any wavelengths of light corresponding to channel n to the isolation means and for transmitting other wavelengths in other bands.

12. An add/drop optical circuit for dropping a channel n comprising a band of wavelengths of light centered about a wavelength λn from a signal including a plurality of channels comprising bands of different wavelengths of light, said optical circuit for providing group delay compensation to the dropped channel n, and for introducing a new channel n replacing the dropped channel n, said optical circuit comprising:

an input port for inserting the signal into the circuit;

a first filtering means comprising a first Bragg grating having a strong reflective response for reflecting substantially all the wavelengths of light within channel n and transmitting a remaining portion of the signal;

first output waveguide for transmitting the remaining portion of the signal;

means for introducing the new channel n into the remaining portion of the signal;

a second filtering means comprising a second Bragg grating having a reflective response that is weaker than the reflective response of the first Bragg grating for reflecting wavelengths of light corresponding to channel n for and transmitting other wavelengths of light, and for providing group delay compensation for wavelengths corresponding to channel n the second Bragg grating being optically coupled to the first Bragg grating;

isolation means between the first Bragg grating and the second Bragg grating; and, at least one output port for receiving wavelengths of light corresponding to channel n from the second Bragg grating.

13. An add/drop optical circuit as defined in claim 12 including an optical circulator for circulating optical signals in a circulating direction from the input port sequentially to a next sequential port, including a port supporting the first Bragg grating, a subsequent port supporting the second Bragg grating and the output port, said circulator providing isolation means between sequential ports.

14. An add/drop optical circuit as defined in claim 12 for dropping a plurality of different channels n each comprising a band of wavelengths of light centered about a different wavelength λn from a signal including a plurality of channels comprising bands of different wavelengths of light, each different channel n having a center wavelength spaced more than one channel band of wavelengths from another different channel n;

the first filter means comprising a plurality of first Bragg gratings each having a different response for reflecting a different channel n and transmitting a remaining portion of the signal;

means for introducing a new channel n comprising means for introducing a plurality of new channels n for replacing the plurality of dropped different channels n;

the second filter means comprising a plurality of second Bragg gratings each having a different response for reflecting a different channel n and for providing group delay compensation for a different channel n;

the output port comprising a plurality of output ports corresponding to the plurality of different channels n.

15. A multiple wavelength optical filtering device for optical signal transmission, said device comprising:

a first optical circulator having at least four circulator ports including an input port, an output port and a plurality of intermediate sequential ports for circulating optical signals from the input port to a next sequential port in a circulating direction; and a first Bragg grating filter having a strong reflective response coupled to one of said sequential ports for reflecting a selected portion of said optical signals in a predetermined wavelength band, and for transmitting another portion of said optical signals at other wavelengths outside the predetermined wavelength band; and a second Bragg grating filter having a lower reflective response than the first Bragg grating coupled to another of the sequential ports for transmitting or reflecting the selected portion of the optical signals in the predetermined wavelength band and for providing group delay compensation to lessen group delay in the selected portion of the optical signal.

16. A multiple wavelength optical filtering device as defined in claim 15, wherein the second Bragg grating comprises a chirped grating to provide group delay or dispersion compensation to lessen group delay or dispersion introduced by the first Bragg grating.

17. A multiple wavelength optical filtering device as defined in claim 16, wherein the chirped grating is adapted to provide a response which when combined with the response of the first Bragg grating is near linear.

18. A multiple wavelength optical filtering device as defined in claim 17, wherein the chirped grating is adapted to provide a response which when combined with the response of the first Bragg grating is substantially flat.

19. A multiple wavelength optical filtering device as defined in claim 17, wherein the second Bragg grating further provides group delay or dispersion compensation to lessen group delay or dispersion introduced by an optical fiber transmitting the signal.

20. A multi-wavelength optical filtering device for optical signal transmission, said device comprising:

a first optical circulator having at least three circulator ports including an input port, an output port and at least one intermediate port for circulating optical signals from the input port to a next sequential port in a circulating direction;

said at least one intermediate port including:

a second Bragg grating filter having a reflective response for reflecting a selected portion of the optical signal in a predetermined wavelength band without introducing substantial group delay in the circulating direction and for providing group delay compensation to lessen group delay in the selected portion of the optical signal, and for transmitting another portion of said optical signals at other wavelengths outside the predetermined wavelength band a first Bragg grating filter having a strong reflective response for receiving the transmittted portion of said optical signals at other wavelengths outside the predetermined wavelengths band for reflecting substantially all of the selected portion of said optical signals and for transmitting another portion of said optical signals at other wavelengths outside the predetermined wavelength band;

isolation means between the second Bragg grating and the first Bragg grating for isolating the second Bragg grating from the reflected selected portion of said optical signals from the first Bragg grating.

21. An optical drop circuit for dropping a channel n comprising a band of wavelengths of light centered about a wavelength λn from a signal including channel n and a plurality of other channels comprising bands of different wavelengths of light, and for providing group delay compensation to the dropped channel n comprising:

an input port for launching a composite multiplexed optical signal comprising signals corresponding to the plurality of channels and a signal corresponding to the nth channel;

an output port optically coupled with the input port to receive signals corresponding to the plurality of channels in a direction from the input port to the output port, light being prevented from passing in a reverse direction from the output port to the input port;

a drop port for receiving light corresponding to the nth channel launched into the input port that has not propagated to the output port;

a Bragg grating filter disposed between the input port and the output port having a response for separating substantially all wavelengths of light in the band corresponding to channel n from the wavelengths of light corresponding to the plurality of other channels in the signal;

a Bragg grating filter between the output port and the drop port having a response for separating the wavelengths of light corresponding to channel n from the different wavelengths of light in the plurality of other channels, and for providing group delay compensation for wavelengths of light corresponding to channel n; and, isolation means between the two Bragg grating filters for preventing light from passing from the output port to the input port and for preventing unwanted etalon effects from occurring between the two Bragg grating filters.

* * * * *